United States Patent
Jung et al.

(10) Patent No.: US 7,336,226 B2
(45) Date of Patent: Feb. 26, 2008

(54) OBJECT IDENTIFICATION SYSTEM COMBINED WITH MILLIMETER-WAVE PASSIVE IMAGE SYSTEM AND GLOBAL POSITIONING SYSTEM (GPS) FOR THE BLIND

(75) Inventors: Kyung-Kwon Jung, Seoul (KR); Yeon-Sik Chae, Seoul (KR); Jin-Koo Rhee, Seoul (KR)

(73) Assignee: Dongguk University-Industry-Academic Cooperation Foundation, Seoul (KR)

( * ) Notice: Subject to any disclaimer, the term of this patent is extended or adjusted under 35 U.S.C. 154(b) by 0 days.

(21) Appl. No.: 11/535,387

(22) Filed: Sep. 26, 2006

(65) Prior Publication Data
US 2007/0268178 A1 Nov. 22, 2007

(30) Foreign Application Priority Data
May 16, 2006 (KR) .................. 10-2006-0043658

(51) Int. Cl.
*G01S 1/02* (2006.01)

(52) U.S. Cl. .................................. 342/357.06

(58) Field of Classification Search ........... 342/357.06, 342/357.14, 372, 373; 701/207, 213, 215
See application file for complete search history.

(56) References Cited

U.S. PATENT DOCUMENTS

| | | | |
|---|---|---|---|
| 5,986,786 A | 11/1999 | Crandall, Jr. et al. | |
| 7,187,342 B2 * | 3/2007 | Heisen et al. | 343/853 |
| 2005/0016893 A1 | 1/2005 | Nakagawa et al. | |
| 2005/0134514 A1 * | 6/2005 | Navarro | 343/772 |
| 2006/0273973 A1 * | 12/2006 | Chandler | 343/757 |

* cited by examiner

*Primary Examiner*—Dao Phan
(74) *Attorney, Agent, or Firm*—Lee, Hong, Degerman, Kang & Schmadeka

(57) ABSTRACT

This invention relates to an object identification device, for the blind, that identifies objects such as walls and cars by detecting the ambient environment through a 94-GHz millimeter-wave image system mounted on the eyeglass and inform the situation to the user by transforming the identified signals to the voice or sound.

This invention is designed to not only help the blind in walking but also provide the function to find the person who has a device realizing this invention.

1 Claim, 3 Drawing Sheets

OBJECT IDENTIFICATION SYSTEM COMBINED WITH MILLIMETER-WAVE PASSIVE IMAGE SYSTEM AND GLOBAL POSITIONING SYSTEM (GPS) FOR THE BLIND

Pursuant to 35 U.S.C. § 119(a) this application claims the benefit of earlier filing date and right of priority to Korean Patent Application No. 10-2006-0043658 filed on May 16, 2006; the contents of which is hereby incorporated by reference herein in its entirety.

BACKGROUND OF THE INVENTION

1. Field of the Invention

This invention relates to an object identification device combined with the millimeter-wave passive image system and GPS for the blind, which identifies objects such as walls and cars by detecting the ambient environment through a 94-GHz millimeter-wave image system mounted on the eyeglass and informs the situation to a user by transforming the identified signal to the voice or sound.

2. Background of the Related Art

The development of equipments for the blind has been extremely limited due to the economical efficiency although there has been a significant enhancement, aiming at the improvement of the human being's welfare in these day, in the information industry such as communication technology and computer, making the blind continue to suffer from the inconvenience that they have to lean on others when they utilize public facilities such as public buildings, bus stops and subway stations.

A variety of devices have been invented in order to resolve such an inconvenience of the blind, representatives of which include ultrasonic detector (Patent No. 89-002504 in Korea), interactive guidance system (Patent No. 10-0208772 in Korea) and voice guidance and acoustic signal transmission device (Utility Model 20-0193111 in Korea).

The context of the ultrasonic detector relates to an ultrasonic detector that helps the blind in walking by themselves without leaning on a stick or guide and its signal processing method. The ultrasonic detector irradiates the ultrasonic wave to an object in the atmosphere and makes the echo signal reflected from the object audible by using an signal processing method that makes the echo signal identifiable, allowing the user to identify the position, surface status and shape of the object. The ultrasonic wave is propagated through the atmosphere at the speed of 340 m/s, and the time delay amounting to several milli-seconds of the echo signal of the ultrasonic signal that occurs several meters ahead is too short to be audible. The ultrasonic detector detects the position of an object using a time delay method that the echo signal of the ultrasonic wave is put by order and enlarged along the time axis. However with the ultrasonic detector, it may be difficult to find obstacles, such as protrusions on the bottom, that can not be detected temporary, and to transmit the accurate information accordingly.

For the interactive guidance system featuring the low-voltage detection function to notify the battery exchange time and alarm function against loss in addition to the basic function to enable the blind to find the destination (fixed station), the fixed station installed at the destination that the blind may want to reach enables the blind to reach the destination easily, by communicating with them interactively through their portable devices and generating voice signals to guide them through an earphone or an external speaker. There are a building fixed station, a crossing fixed station and a bus fixed station and a stop fixed station in the fixed station. In addition to the basic function of the fixed station that makes a response with the wireless voice signal or speaker voice signal to the portable device, the crossing fixed station provides a signal generator switch setup function and the stop fixed station provides a bus call relay function. For this technology, the blind should have a portable device and fixed stations that can communicate with a portable device of the blind should be installed at buildings, crossings and buses, causing high-cost preparations.

The context of the voice guidance and acoustic signal transmission device relates to the transmission device that requests a voice guidance broadcast and acoustic signal to the voice guidance machine or acoustic signal generator when the blind pass through a crosswalk or a public place. Regardless of the place where the voice guidance device/acoustic signal transmission device is installed, it enables the blind to make sure a comfortable and safe job/life environments by providing audible voice guidance's and acoustic signal broadcasts through the continuous switching-transmission of signals using the vibration generated at the time when the blind walk at any public place. However it may suffer from failures due to weather status or seasonal change because it is installed at an outer side, and the installation cost is quite high because many signal devices should be arranged to ensure the system works effectively.

SUMMARY OF THE INVENTION

In order to the said problems, this invention aims at providing an object identification device combined with millimeter-wave passive image system and GPS for the blind, which helps the blind in walking by identifying the blind's accurate position and the location/shape of an object/obstacle on the walking pass through the blind's eyeglass on which the passive image system using the GPS and millimeter-wave is mounted and notifying the situation to the blind.

In order to achieve the said purpose, this inventions provides an object identification device combined with the millimeter-wave passive image system and GPS for the blind, which consists of a millimeter-wave passive image wireless circuit that consists of a patch antenna array, a low-noise amplifier and a phase shifter required for the millimeter-wave image system to transmit/receive the millimeter wave for the detection of millimeter-wave image signal; and a control unit that consists of an array antennal beam forming unit for the beam forming of the millimeter-wave, a signal process unit to analyze millimeter wave images, a global positioning system (GPS) antenna to receive position signals from the satellite and a GPS control unit to control signals received from the GPS antenna; and an operation unit that consists of an object identification unit and a position navigation unit to constitute the information about the ambient situation by using the signal-processed data; and an audio process unit that consists of a voice process unit for the voice transformation using the millimeter image information and position information and a audio generation unit to generate the transformed voice.

BRIEF DESCRIPTION OF THE DRAWINGS

FIG. 2 shows a configuration view of an eyeglass-type object identification device combined with the millimeter-wave passive image system for the blind.

DETAILED DESCRIPTION OF INVENTION

This inventions provides an object identification device combined with the millimeter-wave passive image system and GPS for the blind, which consists of a millimeter-wave passive image wireless circuit that consists of a patch antenna array, a low-noise amplifier and a phase shifter required for the millimeter-wave image system to transmit/receive the millimeter wave for the detection of millimeter-wave image signal; and a control unit that consists of an array antennal beam forming unit for the beam forming of the millimeter-wave, a signal process unit to analyze millimeter wave images, a global positioning system (GPS) antenna to receive position signals from the satellite and a GPS control unit to control signals received from the GPS antenna; and an operation unit that consists of an object identification unit and a position navigation unit to constitute the information about the ambient situation by using the signal-processed data, and an audio process unit that consists of a voice process unit for the voice transformation using the millimeter image information and position information and a audio generation unit to generate the transformed voice.

This invention relates to an object identification device combined with the millimeter-wave passive image system and GPS to help the blind in walking by installing GPS and 94 GHz millimeter-wave image system at the blind's eyeglass. The detailed descriptions on this invention are followed with some drawings.

Figure 1:
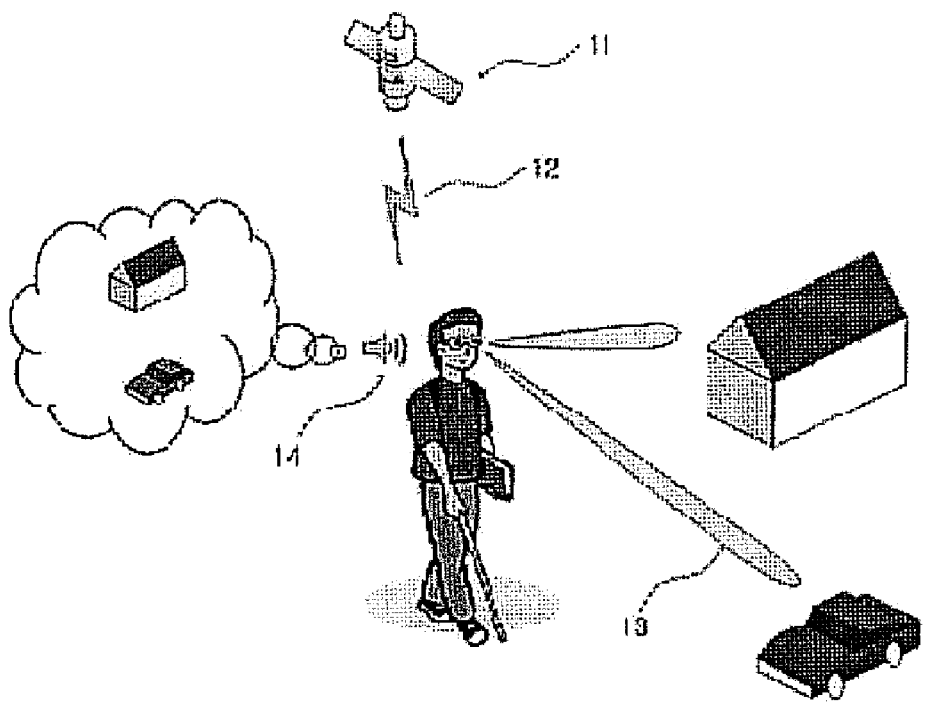
FIG. 1 shows a schematic view representing the used state of the object identification device combined with the millimeter-wave passive image system and GPS for the blind in accordance with this invention.

FIG. 1 shows a schematic view representing the used state of the device in accordance with this invention. Therein, the GPS mounted on the blind's eyeglass identifies the accurate position of the blind through the communication (12) with the satellite (11) and the millimeter-wave (13) image system identifies the shape and location of peripheral objects, helping the blind in walking. The position and object information collected by the GPS and image system is transferred to the blind as a voice or sound (14) through a small speaker mounted on the eyeglass frame.

Figure 2A:
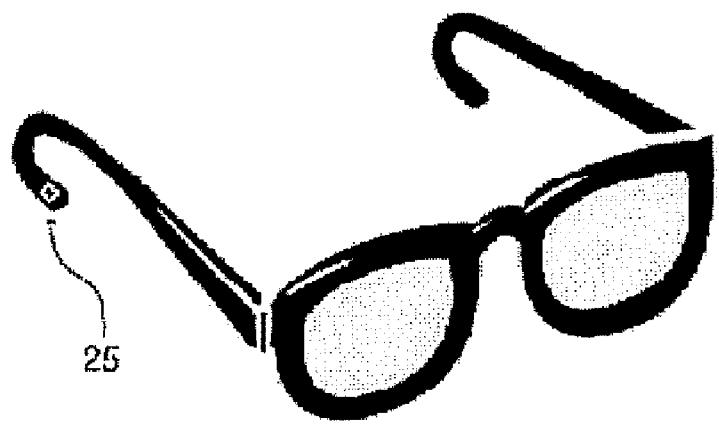
FIG. 2(a) shows an embodiment of the overall configuration in accordance with this invention.

FIG. 2 shows a configuration view of an eyeglass-type object identification device, and it can be devised as an eyeglass-type one in FIG. 2(a).

Figure 2B:
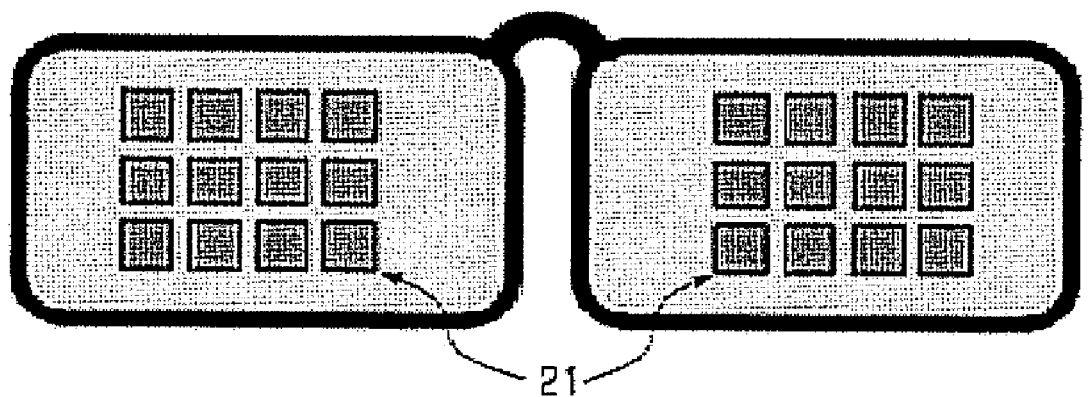
FIG. 2(b) shows a front view of the FIG. 2(a) and FIG. 2(c) shows a rear view of the FIG. 2(a).

FIG. 2(b) shows a front view of the eyeglass-type device, which consists of millimeter-wave passive image wireless circuits (21) to detect the millimeter-wave image signals. Each millimeter-wave wireless circuit consists of an antenna, a LNA (low-noise and a phase shifter. The antenna is configured as a shape of the patch antenna that allows an impact size, and constructed as an array to ensure the accuracy of the received images. In addition, the direction and shape of the beam received at the antenna array is controlled by using the beam forming technology. The width of the millimeter-wave is controlled to 4° or less, allowing the device to detect an object located within the radius of 3 m. And, the phase shifter changes the phase of the received millimeter-wave signals in order to prevent the interference between them.

Figure 2C:
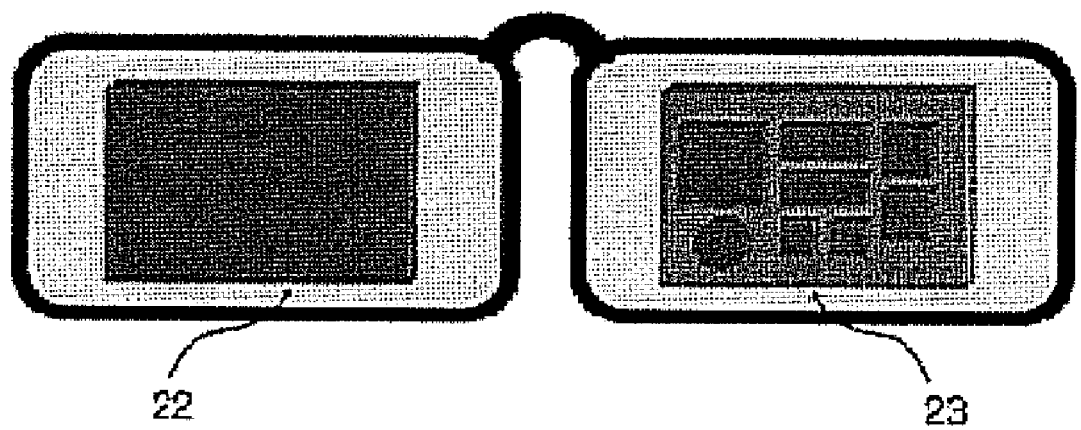

FIG. 2(c) shows a rear view of the eyeglass-type object identification device, which consists of battery (22) for the charge of electrical power to ensure it works properly; and a control device (32) to process the millimeter-wave images and GPS information and to transform them to the voice or sound. The battery equipped with the chargeable polymer-type thin battery cell can be charged at a way used in normal mobile phones. The control device is designed as an embedded system integrating a micro-processor, digital signal processor and memory, and it is responsible for the signal processing, object identification, GPS control and voice processing/transformation. It processes an image received at the millimeter-wave image system, transforms it to a voice (sound) by identifying people, cars and building walls, and informs the user the situation through a speaker or earphone (24) mounted on the eyeglass frame.

Figure 3:
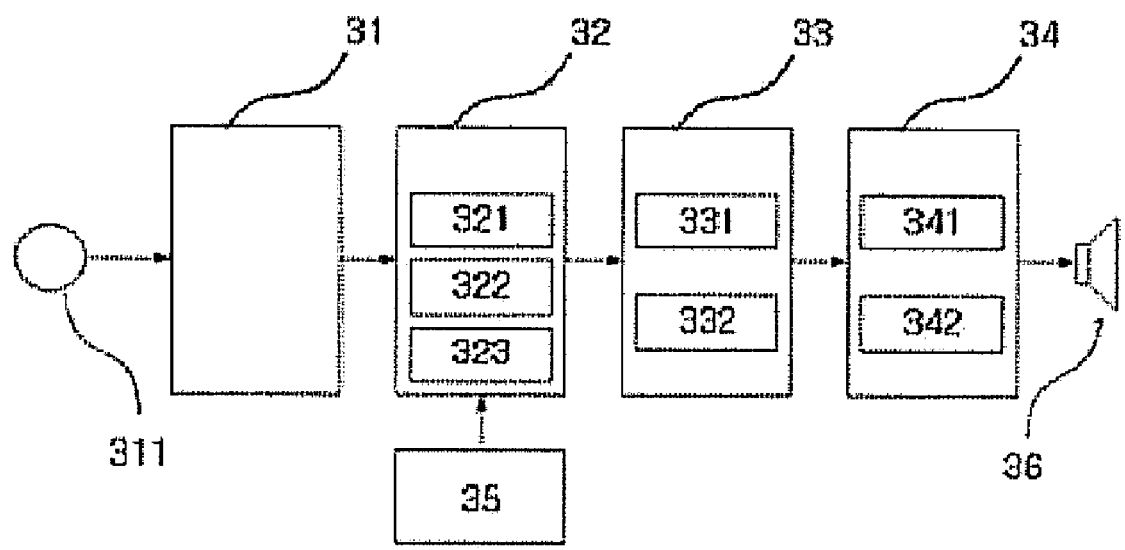
FIG. 3 shows a block diagram of the object identification device in accordance with this invention.

FIG. 3 shows a block diagram of the object identification device mounted on the front side/rear side, The object identification device consists of a millimeter-wave wireless circuit (31); and a control unit (32) for the millimeter-wave beam forming and signal processing; and an operation unit (33) to constituent the information about the ambient situation using the signal-processed data; and an audio process unit (34) to transform the constituted information to the voice or sound; a speaker or earphone (34) to generate the processed voice or sound and detail configuration and function of each component is as follows;

The millimeter-wave passive image wireless circuit (31) consists of a patch antenna array (311), a low-noise amplifier and a phase shifter, all components of which are mounted on the front side of the eyeglass. The antenna receives the millimeter-wave signals and the low-noise amplifier tries to amplify the received signals. In addition, the phase shifter changes the phase of the received millimeter-wave signals to avoid the interference between them.

The control unit (32) consists of an array antenna beam forming unit (321) for the millimeter-wave beam forming; and a signal process unit to analyze the millimeter-wave images (322); and a GPS control unit (323) to control the signals received at the GPS antenna. The array antenna beam forming unit controls the beam width to ensure that the device can detect an object within the radius of 3 m by setting the width of the millimeter-wave signal beams received at the antenna to 4° or less, and the signal process unit determines the shape and material of the object by analyzing the received millimeter-wave images. The GPS control unit analyzes the received satellite information.

The operation unit (33) consists of an object identification unit (331); and a position navigation unit (332). It constituents the information about the ambient situation using the data acquired from the signal processing at the object identification unit for various image signals, and the position navigation unit plays a role of determining the accurate current position of the user by comparing the position information analyzed at the GPS control unit with the pre-stored position information.

The audio process unit (34) consists of a voice process unit (341) to transform the millimeter image information and position information to the voice; and a voice generation unit (342) to generate the transformed voice.

The voice information that is transformed at the audio process unit and transferred to the voice generation unit sounds through the speaker or earphone (36).

Figure 4:
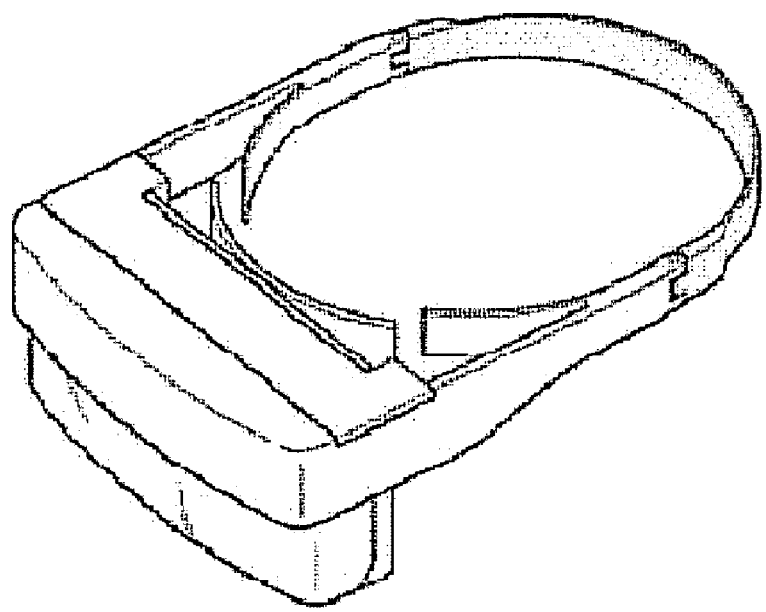
FIG. 4 shows a configuration view of the Head Mounted Display (HMD)-type object identification device combined with the millimeter-wave passive image system and GPS for the blind

The said object identification device can be devised as an eyeglass-shape, as well as head mounted display (HMD)-shape for the beauty purpose. FIG. 4 shows an example of the HMD-type object identification device.

The object identification device combined with the millimeter-wave passive image system and GSP for the blind in accordance with this invention may help the blind in walking by identifying the accurate position of the blind and location/shape of a variety of front objects/obstacles and notifying the situation to the blind with the voice or sound, and can be used to detect the accurate position of the user who has the device realizing this invention thanks to the built-in GPS as well. The millimeter-wave image system can be used as a compact device for the antiterrorism because it can be helpfully used to find some objects, such as firearms or illegal objects that are not clearly identified with the X-ray search at airports and harbors.

In addition, the performance of the millimeter-wave image system is superior to that of the image acquisition using the infrared even at abnormal weather situations because it uses the thermal noise radiated from an object, helpful for the normal people get a clean view.

What is claimed is:

1. An object identification device combined with a millimeter-wave passive image system and global positioning system (GPS) for the blind, comprising:
    a millimeter-wave passive image wireless circuit (31) that consists of a patch antenna array, a low-noise amplifier and a phase shifter required for the millimeter image system to transmit/receive the millimeter-wave for the detection of millimeter-wave image signals;
    a control unit that consists of an array antenna beam forming unit (321) for the beam forming of the millimeter-wave, a signal process unit (322) to analyze millimeter wave images, a GPS antenna (35) to receive position signals from a satellite and a GPS control unit (322) to control signals received from the GPS antenna;
    an operation unit (33) that consists of an object identification unit (331) and a position navigation unit (332) to constitute the information about the ambient situation by using signal-processed data; and
    an audio process unit (34) that consists of a voice process unit (341) for voice transformation using the millimeter image information and position information and a audio generation unit (342) to generate the transformed voice.

* * * * *